(12) United States Patent
Zavodny et al.

(10) Patent No.: US 8,378,618 B2
(45) Date of Patent: Feb. 19, 2013

(54) SYSTEMS AND METHODS FOR CONTROLLING OPERATIONS OF A MOTOR

(75) Inventors: Stephen A. Zavodny, Fort Wayne, IN (US); Luis D. Morales, Fort Wayne, IN (US); Jared D. Zumstein, Fort Wayne, IN (US)

(73) Assignee: SNTECH, Inc., Phoenix, AR (US)

( * ) Notice: Subject to any disclaimer, the term of this patent is extended or adjusted under 35 U.S.C. 154(b) by 458 days.

(21) Appl. No.: 12/708,960

(22) Filed: Feb. 19, 2010

(65) Prior Publication Data

US 2011/0204832 A1 Aug. 25, 2011

(51) Int. Cl.
*H02P 23/00* (2006.01)
*H02P 25/00* (2006.01)
*H02P 27/00* (2006.01)

(52) U.S. Cl. ........................ 318/779; 318/772; 318/778
(58) Field of Classification Search .................. 318/772, 318/778, 779
See application file for complete search history.

(56) References Cited

U.S. PATENT DOCUMENTS

| | | | |
|---|---|---|---|
| 4,103,212 A | 7/1978 | Spradling | |
| 4,322,665 A | 3/1982 | Landgraf | |
| 4,408,150 A | 10/1983 | Holston et al. | |
| 4,459,519 A | 7/1984 | Erdman | |
| 4,737,701 A | 4/1988 | Hoemann et al. | |
| 5,010,282 A | 4/1991 | Moberg | |
| 5,041,749 A | 8/1991 | Gaser et al. | |
| 5,041,775 A | 8/1991 | Erdman | |
| 5,053,686 A | 10/1991 | Juarez | |
| 5,327,064 A | 7/1994 | Arakawa et al. | |
| 5,818,194 A | 10/1998 | Nordby | |
| 5,825,111 A | 10/1998 | Fei | |
| 6,120,262 A | 9/2000 | McDonough et al. | |
| 6,121,746 A | 9/2000 | Fisher et al. | |
| 6,329,778 B1* | 12/2001 | Culp et al. | 318/434 |
| 6,329,783 B1* | 12/2001 | Vrionis et al. | 318/772 |
| 6,369,536 B2 | 4/2002 | Beifus et al. | |
| 6,825,626 B2 | 11/2004 | Peterson | |
| 7,215,052 B2 | 5/2007 | Blase et al. | |
| 7,443,119 B2 | 10/2008 | Liu | |
| 7,514,887 B2 | 4/2009 | Mullin et al. | |
| 2003/0011342 A1* | 1/2003 | Eichorn | 318/727 |
| 2007/0285042 A1* | 12/2007 | Frankel et al. | 318/599 |
| 2008/0050100 A1 | 2/2008 | Peng et al. | |
| 2008/0122392 A1 | 5/2008 | Archer et al. | |
| 2008/0180048 A1 | 7/2008 | Mullin et al. | |
| 2009/0104034 A1* | 4/2009 | Takada | 416/61 |
| 2009/0322276 A1* | 12/2009 | Yamanaka | 318/811 |
| 2010/0060219 A1* | 3/2010 | Schock et al. | 318/400.21 |
| 2010/0237808 A1* | 9/2010 | Kwon et al. | 318/148 |

\* cited by examiner

*Primary Examiner* — Walter Benson
*Assistant Examiner* — Gabriel Agared
(74) *Attorney, Agent, or Firm* — Knobbe Martens Olson & Bear, LLP

(57) ABSTRACT

A method for controlling a motor is described. The method includes configuring a current sensor to sense a current supplied to the motor from at least one of a plurality of power lines and to generate at least one current signal indicative of the sensed current. The method also includes coupling a processing device to the current sensor such that the processing device receives the current signal. The method also includes configuring the processing device to determine which of the plurality of power lines is active based at least partially on the current signal and generate a motor speed control signal that directs the motor to operate at the motor speed that corresponds to the active power line.

20 Claims, 5 Drawing Sheets

SYSTEMS AND METHODS FOR CONTROLLING OPERATIONS OF A MOTOR

BACKGROUND OF THE INVENTION

The field of the invention relates generally to electric motors, and more specifically, to systems and methods that facilitate replacing an induction motor with an electrically controlled variable speed motor in aquatic applications.

One of many uses of an electric motor is to operate a pump, and in turn, move a fluid. Examples of aquatic applications for pumps include pools, spas, and hot tubs. Such applications include a basin or tub structure that holds a supply of water and a circulation pump system. For example, the circulation pump system may include a pump and a pump motor. The pump, in combination with the pump motor, facilitates water filtering and heating by removing water from the tub structure, through a filter and/or heater, and returning the water into the tub structure.

A common motor used in such pump systems is an alternating current (AC) induction motor, for example, a single-speed AC induction motor or a two-speed AC induction motor. The two-speed AC induction motor is configured to operate at a high speed and at a low speed. At the low speed, a rate of water flowing through the pump is decreased when compared to the motor operating at the high speed. The pump motor operating at low speed consumes less electrical power, although, cost savings from lower energy consumption may be offset because the pump system has to operate for a longer period of time at the low speed to circulate the same amount of water as the pump system at high speed.

Other types of motors may be included in a pump system, for example, electronically commutated motors (ECM). Examples of ECMs are brushless direct current (BLDC) motors, permanent magnet alternating current (PMAC) motors, and variable reluctance motors. Typically, these motors provide higher electrical efficiency than an AC induction motor. ECMs also facilitate variable speed operation of the pump system. Therefore, replacing an AC induction motor in a pool, spa, or hot tub with an ECM typically will reduce the operating costs associated with heating and/or filtering the pool, spa, or hot tub. However, ECMs and AC induction motors are not interchangeable, due at least in part to differences between how ECMs and AC induction motors are powered and controlled. The speed at which a two-speed AC induction motor operates depends upon which of two inputs receives an electrical power. A voltage, for example, a 115 VAC or 230 VAC voltage, is provided to either a high speed power line or a low speed power line. The two-speed AC induction motor operates at a high speed when operating power is provided to the high speed power line, and to high speed coils, of the AC induction motor. The two-speed AC induction motor operates at a low speed when operating power is provided to the low speed power line, and to low speed coils, of the AC induction motor. In contrast, an ECM typically receives an operating power from a power source at a motor drive unit, and varies a speed of operation of the motor based on a low-voltage control signal.

BRIEF DESCRIPTION OF THE INVENTION

In one aspect, a method for controlling a motor is provided. The method includes configuring a current sensor to sense a current supplied to the motor from at least one of a plurality of power lines and to generate at least one current signal indicative of the sensed current. The method also includes coupling a processing device to the current sensor such that the processing device receives the at least one current signal. The method also includes configuring the processing device to determine which of the plurality of power lines is active based at least partially on the at least one current signal. The method also includes configuring the processing device to generate a motor speed control signal that directs the motor to operate at the motor speed that corresponds to the active power line, wherein a first active power line of the plurality of power lines corresponds to a first motor speed and a second active power line of the plurality of power lines corresponds to a second motor speed.

In another aspect, a motor control system is provided. The motor control system includes a current sensing device coupled to at least a high speed power line and a low speed power line. The current sensing device is also coupled to at least one of a motor and a motor control unit and the current sensing device is configured to sense at least one of a current supplied to the motor by the high speed power line and a current supplied to the motor by the low speed power line. The motor control system also includes a processing device coupled to the current sensing device and configured to receive at least one current signal from the current sensing device. The at least one current signal corresponds to the current sensed by the current sensing device. The processing device is configured to determine which of the high speed power line and the low speed power line is active based at least partially on the at least one current signal.

In yet another aspect, a motor system is provided. The motor system includes an electric motor and a motor controller coupled to the electric motor and configured to control operation of the electric motor based on a received motor speed control signal. The motor system also includes a user interface coupled to the motor controller. The user interface includes a current sensing device coupled to the motor controller and to a plurality of power supply lines. The current sensing device is configured to sense a current supplied to the electric motor. The user interface also includes a processing device coupled to the current sensing device and configured to determine which of the plurality of power supply lines is currently active. The processing device is also configured to generate the motor speed control signal that corresponds to the active power supply line, and to provide the motor speed control signal to the motor controller.

DETAILED DESCRIPTION OF THE INVENTION

Technical effects of the systems and methods described herein include at least one of: (a) determining which of a plurality of power lines is active based at least partially on a current drawn by a motor; and (b) generating a motor speed control signal that directs the motor to operate at the motor speed associated with the active power line. The systems and methods described herein facilitate operating an electronically controlled variable speed motor, for example, an electronically commutated motor (ECM), using power and control signals supplied by a first power line or a second power line, wherein the first power line is associated with a first motor speed and the second power line is associated with a second motor speed. The systems and methods described herein facilitate replacing an induction motor in an aquatic application with an electronically controlled variable speed motor.

Figure 1:
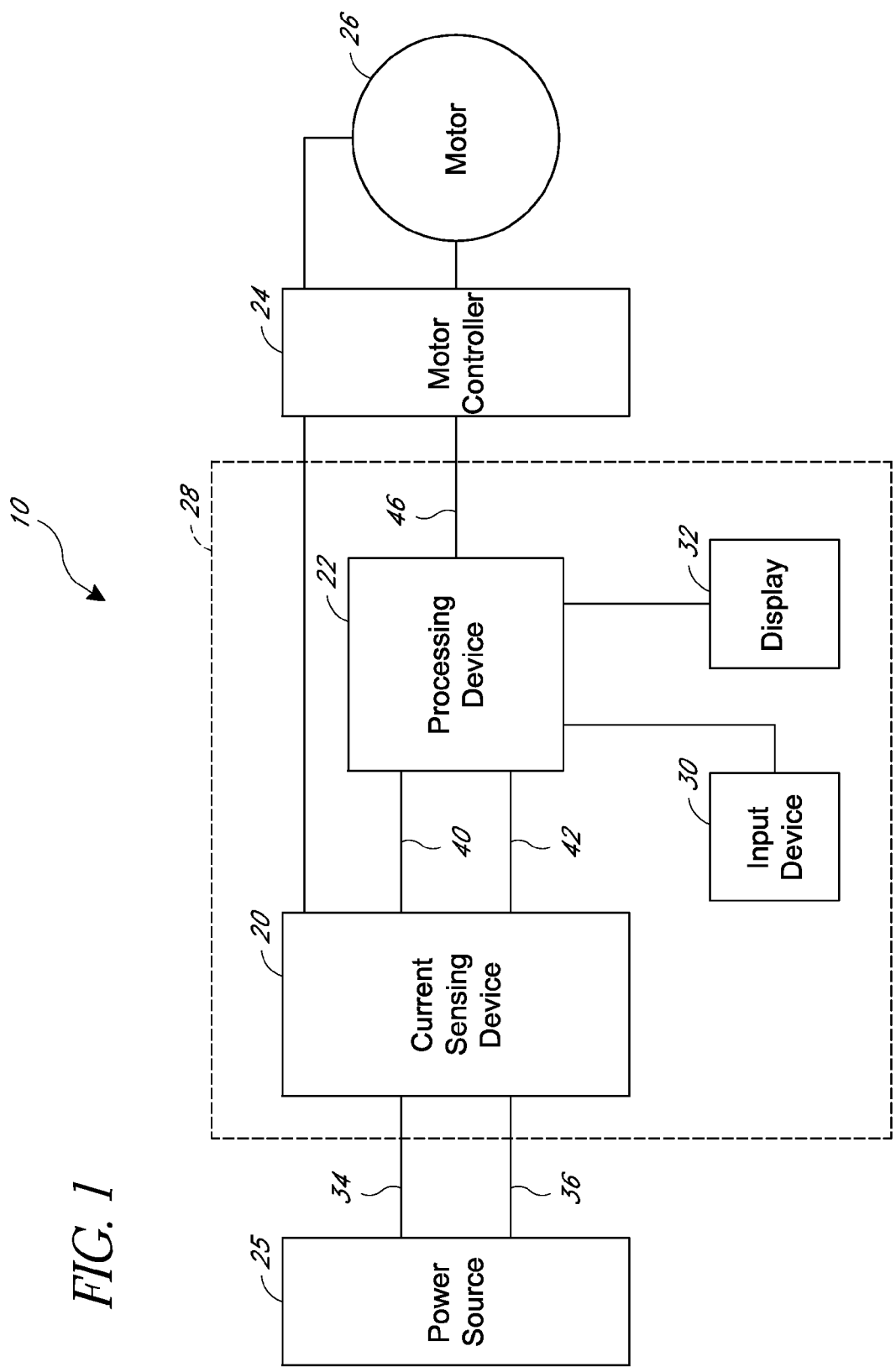
FIG. 1 is a block diagram of an exemplary embodiment of a motor control system.

FIG. 1 is a block diagram of an exemplary motor control system 10. In the exemplary embodiment, motor control system 10 includes a current sensing device 20, a processing device 22, and a motor controller 24. More specifically, current sensing device 20 is coupled to a power source 25, processing device 22, and motor controller 24. Processing device 22 is also coupled to motor controller 24. Power source 25 in aquatic applications is typically a supply of AC electric power, for example, a 115 VAC or 230 VAC voltage. Motor control system 10 is configured to power and control a motor 26. Although described herein as separate, motor controller 24 may be included within motor 26. In the exemplary embodiment, motor 26 is a brushless motor, for example, an electronically controlled variable speed motor, although, other types of motors may be included that allow motor control system 10 to function as described herein. An example of an electronically controlled variable speed motor is an ECM, which may include, but is not limited to, a brushless direct current (BLDC) motor, a permanent magnet alternating current (PMAC) motor, and a variable reluctance motor. In at least some embodiments, current sensing device 20 and processing device 22 are included within a user interface 28. Alternatively, current sensing device 20 and/or processing device 22 may coupled to motor controller 24, but separate from user interface 28, or included within motor controller 24. User interface 28 may also include an input device 30 and a display 32 coupled to processing device 22. Input device 30 facilitates receiving user selections and display 32 facilitates viewing of settings and/or selection options by the user. In the exemplary embodiment, a user is able to provide operating commands to motor 26 via user interface 28, and therefore, user interface 28 is typically positioned to allow for such interaction by the user. Motor 26 may be remote from user interface 28 or may be coupled to user interface 28.

The term processing device as used herein, refers to central processing units, microprocessors, microcontrollers, reduced instruction set circuits (RISC), application specific integrated circuits (ASIC), logic circuits, and any other circuit or processor capable of executing the functions described herein. In the exemplary embodiment, processing device 22 is a mixed signal microprocessor, for example, but not limited to, a programmable system on a chip (PSoC). PSoC is a registered trademark of Cypress Semiconductor Corporation of San Jose, Calif.

In the exemplary embodiment, power source 25 provides electrical power to motor control system 10 via a first power line 34 or a second power line 36. First power line 34 may also be described as a high speed power line and second power line 36 may also be described as a low speed power line. In the exemplary embodiment, current sensing device 20 senses a current supplied to motor 26, for example, a level of current supplied to motor 26 from first power line 34 and/or from second power line 36. In the exemplary embodiment, current sensing device 20 includes at least one Hall effect current sensor (not shown in FIG. 1). In alternative embodiments, current sensing device 20 may include one or more of a resistive shunt current sensor and a current transformer that operate based on the amount of current supplied to motor 26, allowing for current measurement. Current sensing device 20 generates at least one current signal, for example a first current level signal 40 and a second current level signal 42, and provides the at least one signal to processing device 22. Based at least partially on current level signal 40 and/or on current level signal 42, processing device 22 determines which of first power line 34 and second power line 36 is active (i.e., providing electric power to current sensing device 20). Power source 25 delivers electric power to first power line 34 (i.e., first power line 34 is active) when high speed operation of motor 26 is desired. Power source 25 delivers electric power to second power line 36 (i.e., second power line 36 is active) when low speed operation of motor 26 is desired. Processing device 22 generates a motor speed control signal 46 that is provided to motor controller 24. Motor speed control signal 46 directs motor 26 to operate at either high speed or low speed, depending on whether first power line 34 is active or second power line 36 is active. In other words, motor speed control signal 46, generated by processing device 22, directs motor 26 to operate at high speed when first power line 34 is active and at low speed when second power line 36 is active.

Figure 2:
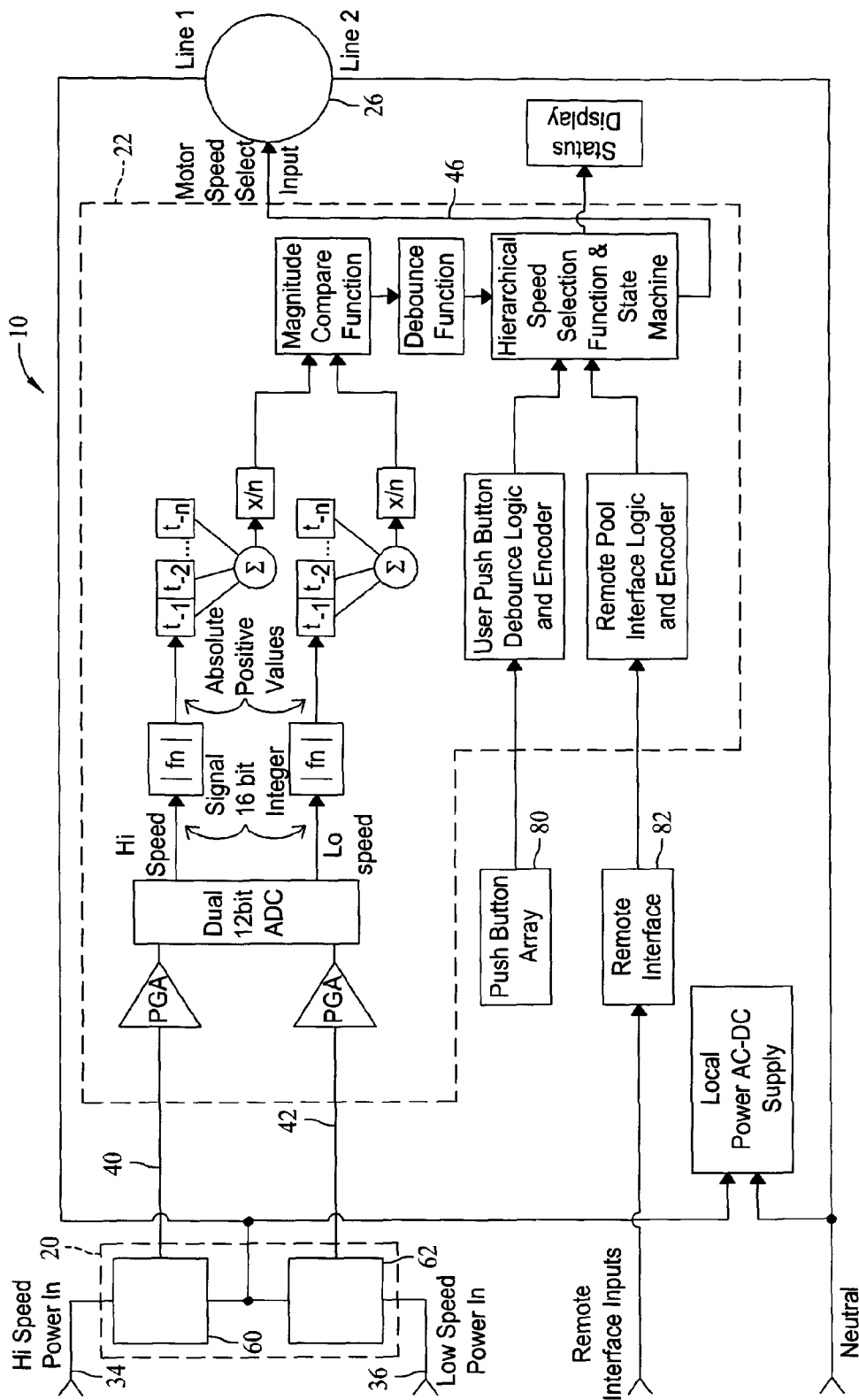
FIG. 2 is an exemplary schematic diagram of the motor control system shown in FIG. 1.
Figure 3A:
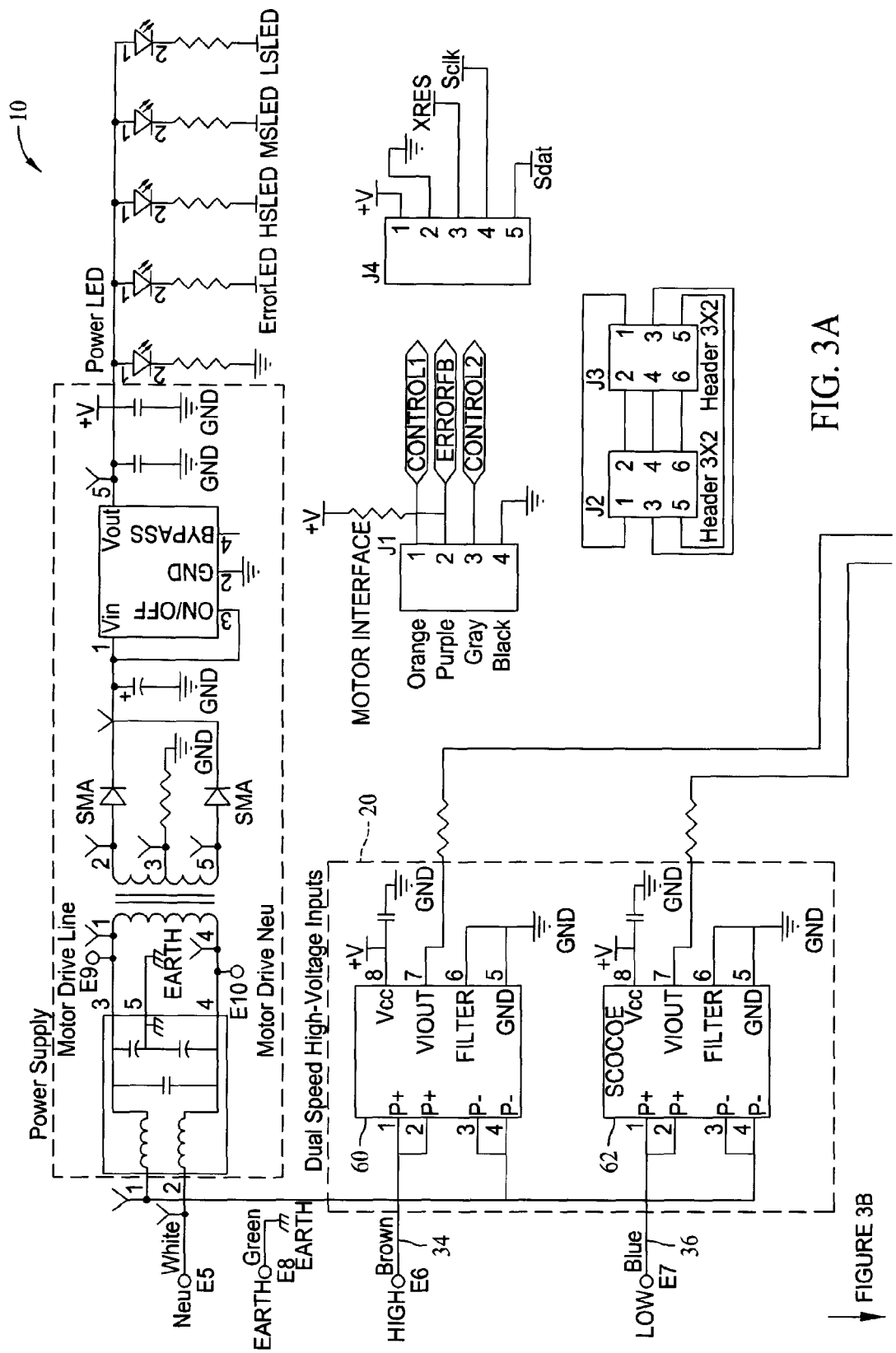
FIGS. 3A and 3B show an exemplary circuit diagram of the motor control system shown in FIGS. 1 and 2.
Figure 3B:
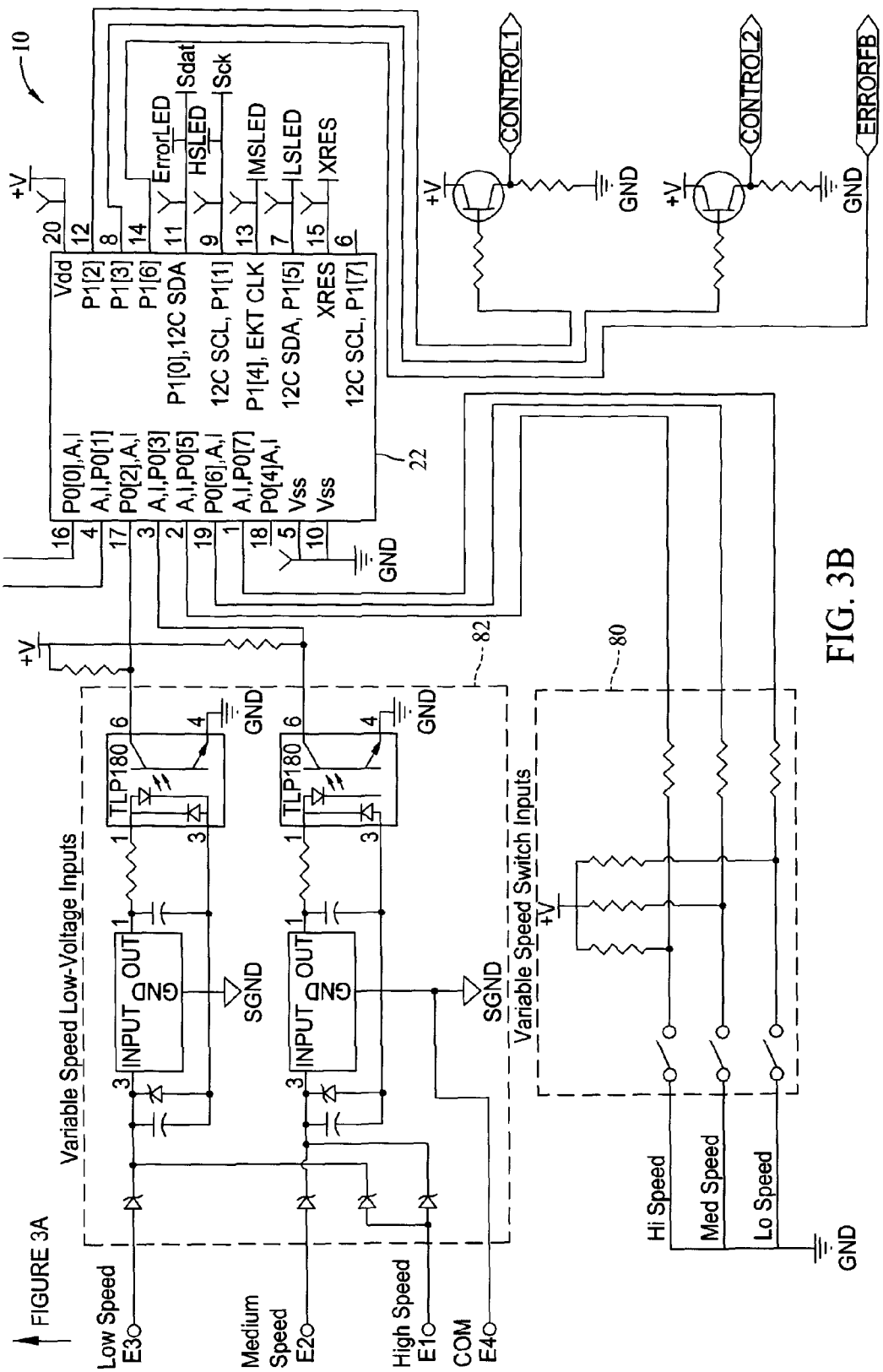

FIG. 2 is a schematic diagram of an exemplary embodiment of motor control system 10 (shown in FIG. 1). FIGS. 3A and 3B show a circuit diagram of an exemplary embodiment of motor control system 10 (shown in FIG. 1 and FIG. 2). Components common to FIGS. 1, 2, 3A, and 3B are identified with the same reference numerals. In the exemplary embodiment, current sensing device 20 includes a first current sensor 60 and a second current sensor 62. More specifically, in the exemplary embodiment, first current sensor 60 and second current sensor 62 are Hall effect current sensors. In alternative embodiments, current sensing device 20 may also include current transformers, resistive shunt current sensors, or any other current sensors that allow current sensing device 20 to function as described herein.

In the exemplary embodiment, processing device 22 generates motor speed control signal 46 based at least partially on which of high speed power line 34 and low speed power line 36 is active. Processing device 22 provides motor speed control signal 46 to motor 26 and/or motor controller 24 (shown in FIG. 1).

In the exemplary embodiment, first current sensor 60 is coupled to first power line 34 and second current sensor 62 is coupled to second power line 36. As described above, power source 25 delivers electric power to first power line 34 (i.e., first power line 34 is active) when high speed operation of motor 26 is desired. Power source 25 delivers electric power to second power line 36 (i.e., second power line 36 is active) when low speed operation of motor 26 is desired. Accordingly, first current sensor 60 generates first current level signal 40, for example, a high speed current analog signal, and provides signal 40 to processing device 22. Second current sensor 62 generates second current level signal 42, for example, a low speed current analog signal, and provides signal 42 to processing device 22. In the exemplary embodiment, processing device 22 determines whether electrical power is applied to motor control system 10 by first power line 34 or second power line 36. Based on at least this determination, processing device 22 generates motor speed control signal 46. In other words, processing device 22 is coupled to current sensing device 20 and configured to receive high speed current analog signal 40 and low speed current analog signal 42 and to determine which of high speed power line 34 and low speed power line 36 is active based on current level signals 40 and 42. Current sensing device 20 is also coupled to at least one of motor 26 and motor controller 24 (shown in FIG. 1) to provide operating power to motor 26. Motor control system 10 uses electrical power received from high speed power line 34 and low speed power line 36 to power and control operation of motor 26.

In an alternative embodiment, motor control system 10 additionally includes an input device, such as a user input device 80 and/or a remote interface 82, coupled to processing device 22. The additional input device provides additional control over operation of motor 26. User input device 80 may include, but is not limited to, an array of switches, a touch screen display, and/or any input device that allows a user to enter a selection, for example, a motor speed selection, into motor control system 10. For example, user input device 80 may allow a user to select from high speed, medium speed, and low speed operation of motor 26. Remote interface 82 may include, but is not limited to, a timer, configured to generate a motor speed control signal dependent upon predefined time periods. For example, remote interface 82 may include a timer that allows a user to instruct motor 26 to operate at a high speed for two hours. Motor 26 will operate at high speed for two hours, and at that time, operate at a speed that corresponds to the power line determination. In the alternative embodiment, processing device 22 determines, based on a stored decision hierarchy, whether to base motor speed control signal 46 on the active power line determination, a selection from user selection input device 80, or a signal from remote interface 82. The decision hierarchy includes priority rankings of the inputs provided to processing device 22. For example, if processing device 22 determines that power is being supplied through low speed power line 36, but also receives a user selection via user input device 80 instructing motor 26 operate at a high speed, processing device 22 sends a high speed signal 46 to motor 26 because a user input is stored with a higher priority than the active power line determination. Similarly, a low speed signal from remote interface 82 is given higher priority by processing device 22 than a determination that power is being supplied through high speed power line 34.

Figure 4:
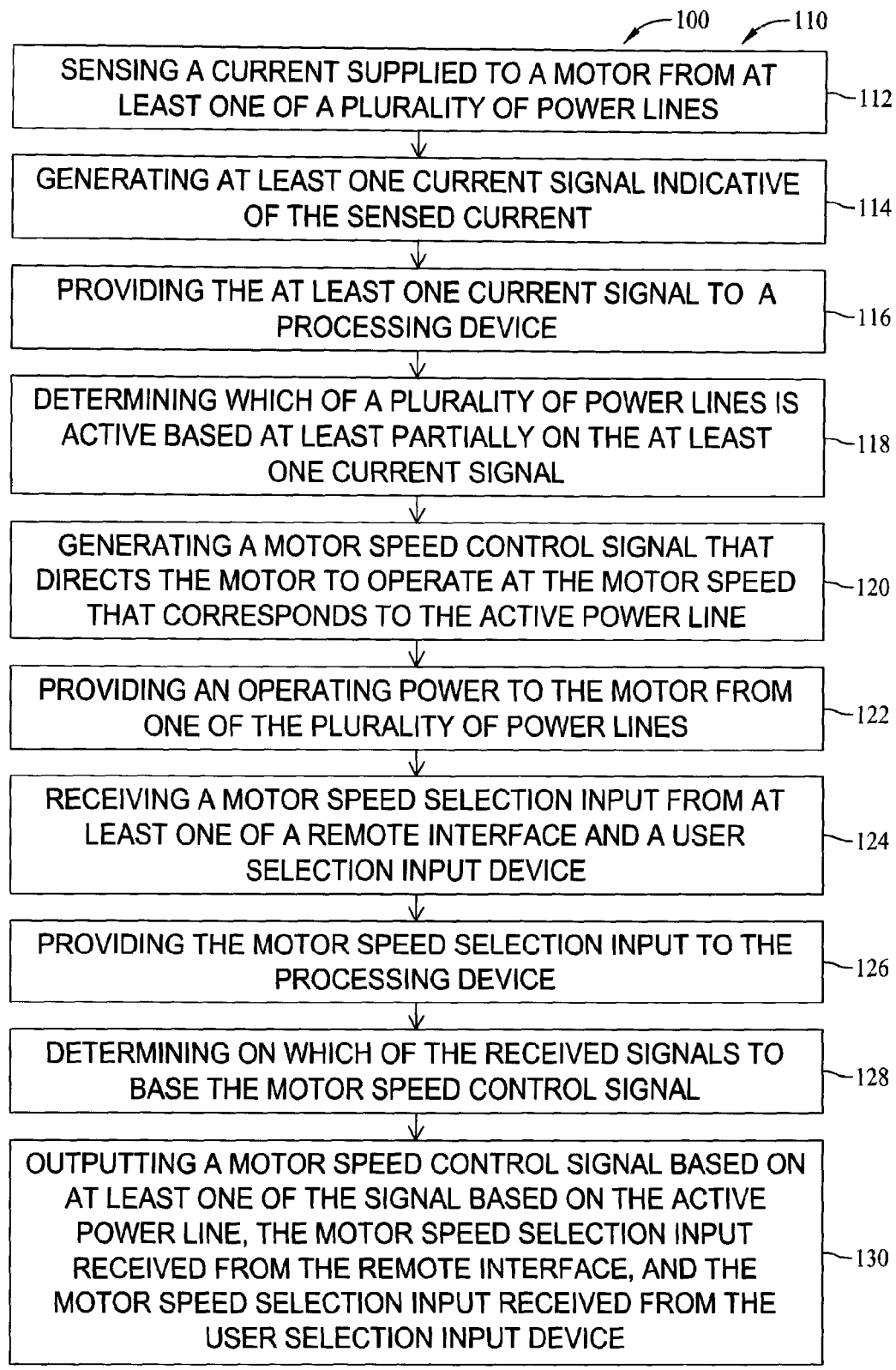
FIG. 4 is a flow chart of an exemplary method for controlling operation of a motor, for example, using the motor control system shown in FIGS. 1-3.

FIG. 4 is flow chart 100 of an exemplary method 110 for controlling operation of a motor, for example, using motor control system 10 (shown in FIGS. 1-3). In the exemplary embodiment, method 110 includes sensing 112 a level of current provided by one of a plurality of power lines to a motor, for example, motor 26 (shown in FIG. 1), using a current sensor, for example, current sensing device 20 (shown in FIG. 1). Method 110 also includes generating 114 at least one current signal indicative of the sensed current. Method 110 also includes providing 116 the at least one current signal, from current sensing device 20, to a processing device, for example, processing device 22 (shown in FIG. 1). The at least one current signal corresponds to the current sensed by current sensing device 20, for example, a level of current sensed by current sensing device 20. Method 110 also includes determining 118, for example, using processing device 22, which of the plurality of power lines is active based at least partially on the at least one current signal. As described above, first power line 34 of the plurality of power lines corresponds to a first motor speed and second power line 36 of the plurality of power lines corresponds to a second motor speed. For example, determining 116 which of the plurality of power lines is active includes determining which of a high speed input power line and a low speed input power line is active.

In the exemplary embodiment, method 110 also includes generating 120 a motor speed control signal, for example, using processing device 22, that directs motor 26 to operate at the motor speed that corresponds to the active power line. Method 110 also includes providing 122 an operating power to motor 26 from the active power line of the plurality of power lines.

In an alternative embodiment, method 110 also includes receiving 124 a motor speed selection input from at least one of a remote interface and a user selection input device and providing 126 the motor speed selection input to processing device 22. Furthermore, method 110 may also include determining 128 on which of the received signals to base the motor speed control signal. Determining 128 includes applying a decision hierarchy that ranks the relative priority of the received signals. Method 110 also includes outputting 130, from processing device 22, a motor speed control signal based on at least one of the active power line, the motor speed selection input received from the remote interface, and the motor speed selection input received from the user.

The systems and methods described herein facilitate controlling an electronically controlled variable speed motor based at least partially on whether power is provided by a high speed power line or a low speed power line. The systems and methods described herein may also facilitate retrofitting an application that includes a brushed electric motor, for example, an induction motor, with a retrofit ECM, for example, but not limited to, a retrofit BLDC motor, a retrofit PMAC motor, or a retrofit variable reluctance motor. More specifically, motor control system 10 is configured to receive power in a manner typically provided to an induction motor, and generate control signals based on the received inputs that direct an ECM to provide the application with a substantially similar output to that provided by the original induction motor. Moreover, motor control system 10 is configured to power the ECM using power lines typically provided to an induction motor. In the exemplary embodiment, a power source provides electrical power to current sensing device 20 via a first power line 34 and/or a second power line 36. In the exemplary embodiment, first power line 34 and second power line 36 are speed taps configured to provide electrical power to, and to control operation of, an induction motor. By measuring a current supplied to the motor, the systems and methods described herein determine which power line is receiving power from the power supply. A motor speed control signal is provided to the motor based at least partially on which power line is receiving power from the power supply.

Described herein are exemplary systems and methods for controlling operation of an electric motor. More specifically, the systems and methods described herein enable retrofitting an aquatic application that is configured to include a brushed electric motor with a variable speed electronically controlled motor, for example, a BLDC motor, a PMAC motor, or a variable reluctance motor. Since the motor control system described herein uses the same two power lines used to power and control a brushed electric motor, the methods and systems described herein facilitate direct replacement of a brushed motor with a variable speed electronically controlled motor without any modifications to the existing application components, structure, or wiring. Using the same two power lines used to power and control a brushed electric motor to power and control a variable speed electronically controlled motor may reduce the cost of such a retrofit.

The systems and methods described herein facilitate efficient and economical installation of high efficiency BLDC motors, PMAC motors, and variable reluctance motors into existing applications in the pool and spa pump markets, as well as other markets, by eliminating the need to rewire the application and/or add additional motor control devices. Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a motor comprising:
    configuring a current sensor to sense a current supplied to the motor from at least one of a plurality of power lines and to generate at least one current signal indicative of the sensed current;
    coupling a processing device to the current sensor such that the processing device receives the at least one current signal; and
    configuring the processing device to:
        determine which of the plurality of power lines is active based at least partially on the at least one current signal, and
        generate a motor speed control signal that directs the motor to operate at the motor speed that corresponds to the active power line, wherein a first active power line of the plurality of power lines corresponds to a first motor speed and a second active power line of the plurality of power lines corresponds to a second motor speed.

2. A method in accordance with claim 1 further comprising providing an operating power to the motor from one of the plurality of power lines.

3. A method in accordance with claim 1, wherein configuring a current sensor comprises configuring a Hall effect current sensor to sense the current supplied to the motor.

4. A method in accordance with claim 1, wherein configuring the processing device to determine which of a plurality of power lines is active comprises configuring the processing device to determine which of a high speed input power line and a low speed input power line is active, the high speed input power line corresponding to high speed operation of the motor and the low speed input power line corresponding to low speed operation of the motor.

5. A method in accordance with claim 1, wherein configuring a current sensor comprises configuring at least one of a current transformer and a resistive shunt current sensor to sense the current supplied to the motor.

6. A method in accordance with claim 1 further comprising configuring at least one input device to receive a motor speed selection input from at least one of a remote interface and a user selection input device and provide the motor speed selection input to the processing device.

7. A method in accordance with claim 6 further comprising configuring the processing device to output a motor speed control signal based on at least one of the active power line determination, a selection from the user selection input device, and a signal from the remote interface.

8. A method in accordance with claim 7 further comprising configuring the processing device to determine on which of the received signals to base the motor speed control signal based at least partially on a stored hierarchy of received signals.

9. A motor control system comprising:
    a current sensing device coupled to at least a high speed power line and a low speed power line, said current sensing device also coupled to at least one of a motor and a motor control unit, said current sensing device configured to sense at least one of a current supplied to the motor by the high speed power line and a current supplied to the motor by the low speed power line; and
    a processing device coupled to said current sensing device and configured to receive at least one current signal from said current sensing device, the at least one current signal corresponding to the current sensed by said current sensing device, said processing device configured to determine which of the high speed power line and the low speed power line is active based at least partially on the at least one current signal.

10. A motor control system in accordance with claim 9, wherein said current sensing device comprises at least one of a Hall effect current sensor, a current transformer, and a resistive shunt current sensor.

11. A motor control system in accordance with claim 9, wherein said processing device is further configured to:
    generate a motor speed control signal based at least partially on which of the high speed power line and the low speed power line is active; and
    provide the motor speed control signal to the at least one of a motor and a motor control unit.

12. A motor control system in accordance with claim 9 further comprising an input device coupled to said processing device, said input device configured to generate a motor speed control signal for delivery to said processing device.

13. A motor control system in accordance with claim 12, wherein said input device is configured to receive an input from at least one of a remote interface and a user selection input device.

14. A motor control system in accordance with claim 13, wherein said user selection input device comprises a plurality of buttons configured to receive a motor speed selection from a user.

15. A motor control system in accordance with claim 13, wherein said remote interface is a timer configured to generate a motor speed control signal dependent upon predefined time periods.

16. A motor control system in accordance with claim 13, wherein said processing device is further configured to determine, based on a stored decision hierarchy, whether to base a motor speed control signal on the active power line determination, the user selection input device, or the remote interface.

17. A motor control system in accordance with claim 9 configured to use electrical power received from the high speed power line and the low speed power line to power and control operation of an electronically commutated motor.

18. A motor system comprising:
    an electric motor;
    a motor controller coupled to said electric motor and configured to control operation of said electric motor based on a received motor speed control signal; and
    a user interface coupled to said motor controller, said user interface comprising:

a current sensing device coupled to said motor controller and a plurality of power supply lines, said current sensing device configured to sense a current supplied to the electric motor, and a processing device coupled to said current sensing device and configured to determine which of the plurality of power supply lines is currently active, to generate the motor speed control signal that corresponds to the active power supply line, and to provide the motor speed control signal to said motor controller.

19. A motor system in accordance with claim 18, wherein said electric motor is an electronically commutated motor.

20. A motor system in accordance with claim 19, wherein said user interface is configured to facilitate using the electric power supplied by the plurality of power supply lines to power and control operation of the electronically commutated motor.

* * * * *